(12) United States Patent
Clark et al.

(10) Patent No.: US 11,536,400 B2
(45) Date of Patent: Dec. 27, 2022

(54) ZERO FLOW FIREPROOF HOSE UTILIZING ZINC BORATE AND EXPANDABLE GRAPHITE ADDITIVES

(71) Applicant: EATON INTELLIGENT POWER LIMITED, Dublin (IE)

(72) Inventors: Aaron David Clark, Lambertville, MI (US); Tanul Singh, Pune (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 108 days.

(21) Appl. No.: 16/951,145

(22) Filed: Nov. 18, 2020

(65) Prior Publication Data

US 2021/0254760 A1   Aug. 19, 2021

(30) Foreign Application Priority Data

Nov. 20, 2019  (IN) .............................. 201911047351

(51) Int. Cl.
| | | |
|---|---|---|
| *F16L 5/04* | (2006.01) | |
| *B32B 1/08* | (2006.01) | |
| *B32B 15/02* | (2006.01) | |
| *B32B 15/06* | (2006.01) | |
| *B32B 15/085* | (2006.01) | |
| *B32B 15/18* | (2006.01) | |
| *B32B 25/20* | (2006.01) | |
| *B32B 27/32* | (2006.01) | |

(Continued)

(52) U.S. Cl.
CPC ..................................... *F16L 5/04* (2013.01); *B32B 1/08* (2013.01); *B32B 15/02* (2013.01); *B32B 15/06* (2013.01); *B32B 15/085* (2013.01); *B32B 15/18* (2013.01); *B32B 25/20* (2013.01); *B32B 27/322* (2013.01); *C08K 3/04* (2013.01); *C08K 3/38* (2013.01); *B32B 2250/05* (2013.01); *B32B 2264/108* (2013.01); *B32B 2307/304* (2013.01); *B32B 2307/536* (2013.01); *B32B 2307/54* (2013.01); *B32B 2597/00* (2013.01)

(58) Field of Classification Search
CPC .. B32B 1/08; B32B 2597/00; B32B 2307/304
USPC ........ 138/123–127, 137, 140, 141; 428/36.9, 428/36.91
See application file for complete search history.

(56) References Cited

U.S. PATENT DOCUMENTS 7,438,748 B2 * 10/2008 Cogen .................... B82Y 30/00
                                                 106/18.21
8,409,682 B2    4/2013 Fukaya et al.
(Continued)

FOREIGN PATENT DOCUMENTS

| EP | 2184320 | 4/2017 |
| EP | 2919986 | 10/2018 |
| WO | 2017/189478 | 11/2017 |

OTHER PUBLICATIONS

Extended European Search Report for EP Application No. 20207931.5, dated Mar. 12, 2021, 6 pages total.
(Continued)

*Primary Examiner* — Patrick F Brinson
(74) *Attorney, Agent, or Firm* — Merchant & Gould, P.C.

(57) ABSTRACT

A hose is provided capable of meeting fireproof requirements per AS1055 under no flow condition. The hose has multiple layers of fire protection comprising a silicone rubber layer impregnated with additives including zinc borate and expandable graphite.

21 Claims, 5 Drawing Sheets

(51) Int. Cl.
*C08K 3/04* (2006.01)
*C08K 3/38* (2006.01)

(56) References Cited

U.S. PATENT DOCUMENTS

| | | | |
|---|---|---|---|
| 10,190,706 B2 | 1/2019 | Mentink et al. | |
| 2002/0112770 A1* | 8/2002 | Fisher | F16L 11/081 138/140 |
| 2003/0175497 A1* | 9/2003 | Kobe | C09J 7/26 428/317.9 |
| 2005/0211325 A1* | 9/2005 | Takagi | F16L 11/085 138/124 |
| 2008/0102243 A1* | 5/2008 | Gupta | C09J 7/22 428/411.1 |
| 2008/0188590 A1* | 8/2008 | Gupta | C08K 5/0066 523/179 |
| 2012/0040114 A1 | 2/2012 | Chen | |
| 2012/0125470 A1* | 5/2012 | Nanney | F16L 11/087 138/125 |
| 2012/0153242 A1* | 6/2012 | Le Bonte | B32B 5/20 252/62 |
| 2015/0323105 A1 | 11/2015 | Lee | |
| 2016/0304712 A1* | 10/2016 | Yamamoto | C08K 5/49 |
| 2018/0087695 A1* | 3/2018 | Mentink | F16L 11/10 |
| 2019/0062552 A1* | 2/2019 | Guo | C08L 71/12 |
| 2019/0154174 A1 | 5/2019 | Schilling et al. | |
| 2019/0247685 A1 | 8/2019 | Kolte et al. | |

OTHER PUBLICATIONS

Wacker, "Solid and Liquid Silicone Rubber—Material and Processing Guidelines", 2019, 105 pages total.
Wacker, "Silicones—Eslastosil—The grades and properties of Elastosil R solid silicone rubber", 2007, 52 pages total.
Wacker, "Elastosil R 401/60 S", 2020, 3 pages total.
Mine Safety and Health Administration, "MSHA's Standard Flame Test Procedure for: Hose Conduit, Fire Suppression Hose Cover, Fire Hose Liner and Other Materials; Title 30, Code of Federal Regulations, Part 18, Section 18.65", Document No. ASTP 5007, 2010, 7 pages total.
NeoGraf Solutions, "GRAFGUARD—flame retardant additive—technical data sheet 226", 2019, 4 pages total.
Chemours, "Teflon PTFE 62 X Fine Powder Fluoroplastic Resin", 2016, 2 pages total.
Dow, "XIAMETER Silicone Modifiers—Modifier Selection Guide", 2018, 2 pages total.
Dow, "XIAMETER Modifiers", 2017, 4 pages total.
Shepherd, Blue 211 technical data sheet, 2013, 1 page total.
Akzo Nobel Polymer Chemicals LLC, Perkadox PD-50S-ps-a material safety data sheet, 1998, 6 pages total.
AkzoNobel, Perkadox PD-50S-ps product data sheet, 2008, 2 pages total.
Arkema Inc., DI-CUP Dicumyl Peroxide technical information, 2009, 4 pages total.
Brenntag Specialties, Inc., Min-U-Sil and Sil-Co-Sil product data, 2011, 2 pages total.
U.S. Silica Company, Min-U-Sil product data, 2017, 1 page total.
Wacker, "Elastosil R 401/60 High Consistency Silicone Rubber", 2010.
Rio Tinto, Firebrake ZB product data sheet, 2019, 2 pages total.
Rio Tinto, Firebrake ZB safety data sheet, 2015, 13 pages total.
Mine Safety and Health Administration, "MSHA's Standard Flame Test Procedure for: Hose Conduit, Fire Suppression Hose Cover, Fire Hose Liner and Other Materials; Title 30, Code of Federal Regulations, Part 18, Section 18.65", Document No. ASTP 5007, 2014, 8 pages total.
Graphit Kropfmuhl, "Expandable Graphite", 2013, 2 pages total.

* cited by examiner

ZERO FLOW FIREPROOF HOSE UTILIZING ZINC BORATE AND EXPANDABLE GRAPHITE ADDITIVES

CROSS-REFERENCE TO RELATED APPLICATION

This application claims the benefit of Indian Provisional Patent Application No. 201911047351, filed on Nov. 20, 2019, the disclosure of which is incorporated herein by reference in its entirety.

BACKGROUND OF THE DISCLOSURE

Aerospace conveyance products (hoses, tubes, etc.) may be used to convey pressurized fuel, oil, hydraulic fluid, or the like, in locations which may be exposed to fire. In such applications, a fire protection mechanism may be utilized to ensure that the product does not fail (e.g., leak) within a specified duration of time (e.g., 5 to 15 minutes) under specified conditions including specified flow conditions. Some existing fire protection technologies may include integral silicone covers or silicone-coated fiberglass sleeves.

Some aircraft hoses may be certified for use in fire zones as defined by the Federal Aviation Administration (FAA) or applicable certifying authority. For example, aircraft hoses can be configured to withstand direct flame for a certain period of time (e.g., five minutes or fifteen minutes) in order to be certified as being fire resistant or fire proof. Existing aircraft hoses suitable for use in fire zones may be prone to degradation during exposure to fire, which may impact product capability to meet the fire requirement.

In aerospace applications, as aircraft systems have evolved, fire test requirements have become more severe, posing challenges in demonstrating compliance with existing fireproofing technologies. For example, some current fireproof covers may not consistently meet AS1055 and TSO fire performance requirements that permit some flow of fluid through the fluid conveying product during testing, let alone AS1055 no-flow requirements demanded of next-generation fluid conveying products.

U.S. Pat. No. 8,409,682 discloses a heat resistant air hose for diesel engines having an outer layer containing a non-peroxide cross-linkable ethylene acrylic rubber such as an ethylene-methacrylate copolymer and a non-halogen flame retardant such as aluminum hydroxide.

U.S. Pat. No. 10,190,706 discloses a flame resistant hose assembly having an external flame resistant layer comprising a polymeric material and expandable graphite.

U.S. Published Application US 2019/0154174 discloses a fire zone hose including a thermal protection sleeve and an outer braided stainless steel reinforcement.

U.S. Published Application US 2019/0247685 discloses a fireproof cover for fluid conveyance products including alternating intermediate layers of basalt tape and fiberglass.

To meet the zero flow AS1055 and TSO requirements, many existing hoses have to be covered with a fire sleeve designed per AS1072. Fire sleeves increase the outer diameter (OD) of the hose, add weight, and may have wrinkled surfaces, which causes difficulty during clamping of theses hoses in aircraft.

There is a desire for solutions/options that minimize or eliminate one or more challenges or shortcomings of fluid conveyance products, such as to meet more stringent no-flow conditions under AS1055 and TSO fire performance requirements.

SUMMARY OF THE INVENTION

A fireproof hose was designed suitable for use in aircraft to meet AS1055 and TSO requirements for 15 minutes under no flow conditions.

A fireproof hose is provided having a metallic reinforcement layer and one or more, or two or more, thermal insulation layers. The thermal insulation layer(s) may be prepared from a composition comprising a silicone rubber, an expanded graphite, and a zinc borate. The fireproof hose may include an outer thermal insulation layer comprising a silicone, an expanded graphite, and a zinc borate.

The fireproof hose may include an inner tube prepared from a composition comprising PTFE, a metallic reinforcement layer, and outer thermal insulation layer prepared from a composition comprising a silicone rubber, an expanded graphite, and a zinc borate.

A fireproof hose is provided comprising an outer thermal insulating layer prepared from a composition comprising a silicone, an expandable graphite, and a zinc borate. The fireproof hose may optionally further comprising an inner tube layer prepared from a composition comprising PTFE; and a reinforcing layer. The reinforcing layer may be disposed between the inner tube layer and the outer thermal insulating layer. The fireproof hose may optionally further include a fiberglass tape or sleeve layer.

A fireproof hose is provided comprising an outer thermal insulating layer, wherein the thermal insulating composition comprises from about 40-80 wt %, or about 50-70 wt % of a silicone base rubber.

A fireproof hose is provided comprising an outer thermal insulating layer, wherein the thermal insulating composition comprises between about 3-20 wt %, 4-18 wt %, 5-15 wt %, or 8-13 wt %, or about 5 wt %, 6 wt %, 7 wt %, 8 wt %, 9 wt %, 10 wt %, 11 wt %, 12 wt %, 13 wt %, 14 wt %, or 15 wt % of a zinc borate.

A fireproof hose is provided comprising an outer thermal insulating layer, wherein the thermal insulating composition comprises between about 0.1-15 wt %, 0.3-10 wt %, 0.5-5 wt %, 1-3 wt %, or about 1 wt %, 1.1 wt %, 1.2 wt %, 1.3 wt %, 1.4 wt %, 1.5 wt %, 1.6 wt %, 1.7 wt %, 1.8 wt %, 1.9 wt %, 2 wt %, 2.1 wt %, 2.2 wt %, 2.3 wt %, 2.4 wt %, 2.5 wt %, 2.6 wt %, 2.7 wt %, 2.8 wt %, 2.9 wt %, or 3 wt % of an expandable graphite.

A fireproof hose is provided comprising an outer thermal insulating layer, wherein the thermal insulating composition comprises a silicone rubber composition comprising a weight ratio of zinc borate to expandable graphite between about 2.5 to 12; or about 5 to 10.

A fireproof hose is provided comprising an outer thermal insulating layer, wherein the thermal insulating composition further comprises additives selected from the group consisting of curing agents, process aids, additional fire retardants, adhesion promoters, antioxidants, ultraviolet light stabilizers, fillers, thixotropic agents, additional silicones, dyes, and colorants.

A fireproof hose is provided comprising an outer thermal insulating layer, wherein the thermal insulating composition comprises about 0-30 wt %, 1-20 wt %, 5-15 wt %, or about 10-12 wt % of a ground silica filler.

A fireproof hose is provided comprising an outer thermal insulating layer and a reinforcing layer, wherein the reinforcing layer comprises a metallic braid, optionally a stainless steel metallic braid.

A fireproof hose is provided that may comprise a multiplicity of layers from an inner to an outer radial direction comprising: i) an inner tube layer prepared from a composition comprising a PTFE; ii) a first reinforcing layer comprising a metallic braid; iii) a first thermal insulating layer; iv) a second reinforcing layer comprising a metallic braid; and v) a second thermal insulating layer prepared from a composition comprising a silicone, an expandable graphite, and a zinc borate. The fireproof hose comprises a thermal insulating layer that exhibits i) hardness of 70 to 85 Shore A under ASTM 2240; ii) tensile strength between 500 to 750 psi under ASTM D412; iii) percent elongation of from 100 to 200% under ASTM D412; iv) 50% Modulus of from 250 to 350 psi under ASTM D412; and v) 100% Modulus of from 300 to 450 psi under ASTM D412.

A thermal insulating layer silicone rubber composition is provided that when cured passes the flame resistance test when tested under MSHA ASTP5007. The thermal insulating layer silicone rubber composition when cured may pass flame resistance test and exhibit high visual char formation when tested under MSHA ASTP5007 after 5 minutes.

A fireproof hose is provided, wherein the hose meets or exceeds 5 minute and/or 15 minute AS1055 and TSO performance requirements under no flow conditions.

A fireproof hose is provided, wherein the hose is rated for a continuous operating temperature range of −65° F. to +450° F. (−54° C. to +232° C.).

A fireproof hose is provided, wherein the hose is rated for an operating pressure of between about 1000 to about 1500 psig.

A method of making a fireproof hose is provided comprising forming an inner tube layer prepared from a composition comprising a PTFE; braiding a first reinforcing layer comprising a metallic braid over the inner tube layer; extruding a silicone rubber composition over the reinforcing layer to form a thermal insulating layer to form a green hose, wherein the silicone rubber composition comprises a silicone base rubber, an expandable graphite, and a zinc borate; and curing the green hose to form the fireproof hose.

DETAILED DESCRIPTION OF THE INVENTION

Figure 1:
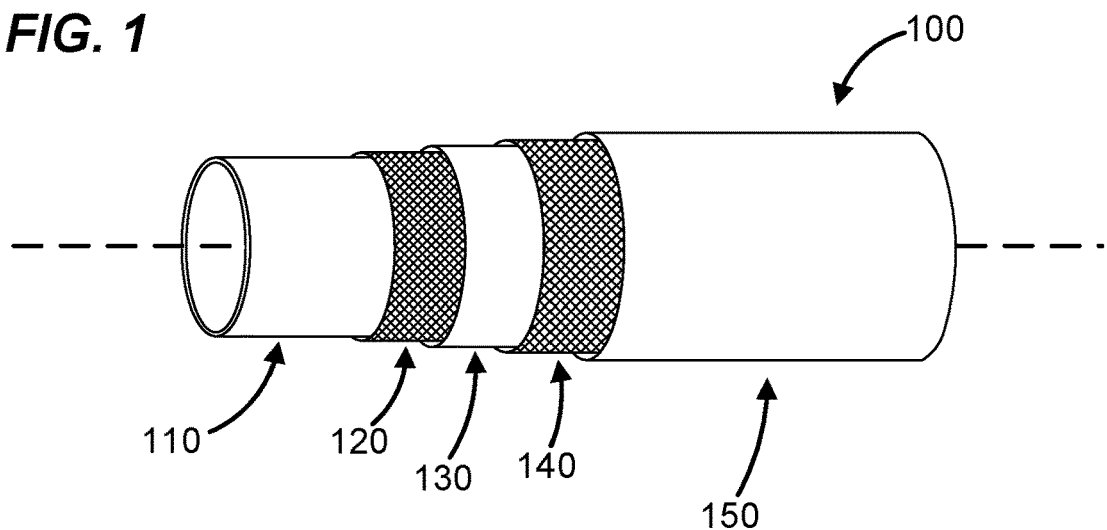
FIG. 1 shows an exemplary fireproof hose construction comprising 5-layers.

A zero flow fireproof hose is provided including multiple layers of thermal insulation covering over a standard metallic hose. These insulations layers include a combination of zinc borate and expandable graphite that exhibits significant improvement in fire protection properties over existing technologies. The hose is suitable for use in aircraft or aerospace vehicle fluid systems. For example, the fireproof hose may be used for fuel, oil, and hydraulic lines.

A "fire-proof" hose line as defined by the FAA must withstand a direct flame for 15 minutes under specified flow conditions without failure. Fire-resistant lines must withstand a 5 minute exposure under these conditions.

A zero flow fireproof hose is provided including a fire resistant thermal insulating layer comprising expandable graphite flakes and zinc borate dispersed in a silicone medium. The expandable graphite flakes and zinc borate act as flame retardant. When the fire resistant layer is exposed to heat, expandable graphite flakes expand (more than 100× by volume) and form a graphite char which acts as a non-burnable, insulating layer. Zinc borate also forms a glassy char when exposed to high temperature preventing flame propagation. Additionally, when the expandable graphite and zinc borate are present within a range of concentrations and/or ratios the zinc borate acts as a binder which will hold the charred layers together preventing them from falling off.

The terminology used herein is for the purpose of describing particular embodiments only and is not intended to be limiting of the disclosure.

The singular forms "a", "an" and "the" are intended to include the plural forms as well, unless the context clearly indicates otherwise.

The term "and/or" refers to and encompasses any and all possible combinations of one or more of the associated listed items.

As used herein, the term "about" means within ten percent (10%) of the given value, either ten percent more than the given amount or ten percent less than the given amount, or both.

As used herein, the term "composition" refers to one or more of a compound, mixture, blend, alloy, polymer and/or copolymer.

As provide herein, ranges are intended to include, at least, the numbers defining the bounds of the range.

Unless otherwise specified, % values refer to weight %.

The terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise defined, all terms, including technical and scientific terms used in the description, have the same meaning as commonly understood by one of ordinary skill in the art to which this disclosure belongs. In the event of conflicting terminology, the present specification is controlling. All patents, patent applications and publications referred to herein are incorporated by reference in their entirety.

Figure 7:
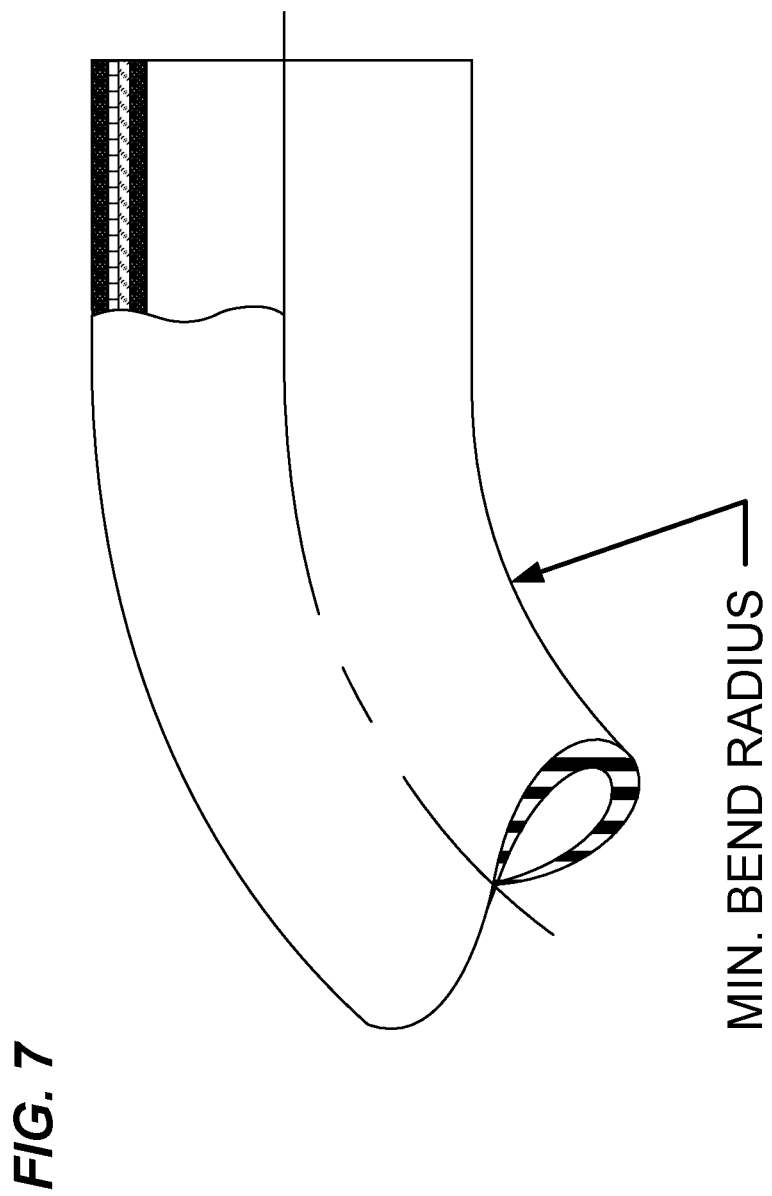
FIG. 7 shows an illustration of the minimum bend radius test.

The properties of the materials were tested in accordance with ASTM D412 (Tensile, elongation & modulus); ASTM D2240 (hardness); Flame resistance was performed according to MSHA ASTP5007 under 30 CFR § 18.65; and Char formation is a visible test after MSHA ASTP5007; Shore A Hardness test was performed in accordance with ASTM D 2240-95, for example, using a calibrated Instron automatic Durometer tester. Bend radius refers to the radius of a bent section of hose measured to the innermost surface of the curved portion. Minimum bend radius as shown in FIG. 7 refers to the smallest radius at which a hose can be used. When bent at too sharp of an angle, a hose may kink or flatten in the cross-section.

SAE 1055 D Aerospace Standard (AS) establishes uniform requirements for fire testing of flexible hose assemblies to be used in aircraft or aerospace vehicle fluid systems. FAA Technical Standard Orders (TSO) are the performance qualifications for aircraft parts, materials, etc. TSO-053a cover Fuel and Engine Oil System Assemblies. TSO-C75 covers hydraulic hose assemblies. Fire protection, fire resistant (5 minute) of fire proof (15 minute) may be designated as "Class A" or "Class B", respectively. Specific low flow rate (for example, fuel and lube oil may be tested at $5 \times ID^2 = \times GPM$ or hydraulic at $1 \times ID^2 = \times GPM$) or no flow testing may be accomplished for selected hose type, size and configuration assemblies. The flow rate, duration of fire test, performance requirements may be specified. AS1055 also defines hose types by material (Type I is Rubber; Type II is PTFE, Type III is rigid (metal) tubing); function (for example, (a) fuel and lube (similar to TSO-053a) or (b) hydraulic (similar to TSO-C75) wherein fluid flow is specified; and compatibility where S is Synthetic fluid and P is petroleum base fluid.

A hose is provided comprising multiple insulation layers that can consistently meet zero flow fireproof condition AS1055 and TSO requirement without addition of external fire sleeve per AS1072. The hose may meet AS1055 fire resistance requirements under no flow conditions for 5 minutes and/or 15 minutes. The fireproof hose of the disclosure may provide further advantages of at least about a 10% weight reduction, and/or at least about 15% envelope reduction compared to existing solutions for zero flow condition. The hose may be a wrinkle free hose including a smooth OD for ease of clamping.

A hose is provided suitable for carrying various fluids under aerospace conditions including fuel, oil, or hydraulic fluids including synthetic fluids such as phosphate ester hydraulic fluids.

A fireproof hose is provided having a multiplicity of layers. The fireproof hose may include an outer layer prepared from a composition that includes a silicone base rubber, an expandable graphite, and a zinc borate.

The fireproof hose of FIG. 1 may be prepared in the hose sizes shown in Table 1.

TABLE 1

Fireproof Hose Sizes, Pressure Specifications and Minimum Bend Radius

| Hose Size | Operating Pressure psig | Proof Pressure psig | Burst Pressure Room Temp Min psig | Burst Pressure High Temp Min psig | Bend Radius at Inside of Bend inch |
|---|---|---|---|---|---|
| 03 | 1500 | 3000 | 12 000 | 7000 | 2.00 |
| 04 | 1500 | 3000 | 12 000 | 7000 | 2.00 |
| 05 | 1500 | 3000 | 10 000 | 6500 | 2.00 |
| 06 | 1500 | 3000 | 9000 | 6500 | 4.00 |
| 08 | 1500 | 3000 | 8000 | 6000 | 4.63 |
| 10 | 1500 | 3000 | 7000 | 5500 | 5.50 |
| 12 | 1000 | 2000 | 5000 | 3500 | 6.50 |
| 16 | 1250 | 2500 | 5000 | 3500 | 7.38 |
| 20 | 1000 | 2000 | 4000 | 3000 | 11.00 |
| 24 | 1000 | 2000 | 4000 | 3000 | 14.00 |

A fireproof hose according to the disclosure may be prepared in any suitable hose size, for example, the hose sizes shown in Table 1, including −03, −04, −05, −06, −08, −10, −12, −16, −20, or −24. The fireproof hose of the disclosure may be rated as a medium pressure hose or a high pressure hose. For example, the fireproof hose of the disclosure may have an operating pressure between 1000 and 1500 psig, or 1000, 1250 or 1500 psig depending on the size on hose size and configuration, for example, according to Table 1. The proof pressure may be from 2000 to 3000 psig, or 2000, 2500 or 2000 psig depending on the size on hose size and configuration. The burst pressure at room temperature may be from 4000 to 12,000 psig, or 4000, 5000, 7000, 8000, 9000, 10,000, or 12,000 psig depending on the size on hose size and configuration. The burst pressure high temp min may be from 3000 to 7000 psig, or 3000, 3500, 5500, 6000, 6500, or 7000 psig depending on the size on hose size and configuration. The fireproof hose according to the disclosure may exhibit a minimum bend radius according to AS1946E specifications. The minimum bend radius at inside of bend may be from 2.00, 4.00, 4.63, 5.50, 6.50, 7.38, 11.00, or 14.00 inches depending on the size on hose size and configuration according to Table 1.

The fireproof hose may be rated for a continuous operating temperature range of −65° F. to +450° F. (−54° C. to +232° C.).

The fireproof hose may include an inner tube prepared from a composition that includes a PTFE; an intermediate metallic reinforcing layer; and an outer layer prepared from a composition that includes a silicone base rubber, an expandable graphite, and a zinc borate.

The fireproof hose may include a first layer inner tube prepared from a composition that includes a PTFE; a second layer that is a metallic reinforcing layer; a third layer prepared from a composition that includes a silicone base rubber, an expandable graphite, and a zinc borate; a fourth layer that is a metallic reinforcing layer; and a fifth layer prepared from a composition that includes a silicone base rubber, an expandable graphite, and a zinc borate. The fifth layer may be the outer layer. The metallic reinforcing layers may include a metallic wire braid, for example, stainless steel.

FIG. 1 shows an exemplary fireproof hose construction 100 comprising 5-layers. Hose 100 may include an inner tube 110, a first reinforcement layer 120, a first thermal insulation layer 130, a second reinforcement layer 140, and an outer thermal insulation layer 150. The external thermal insulation layer 150 and 130 may be prepared from a composition that includes a silicone base rubber, an expandable graphite, and a zinc borate.

Figure 2:
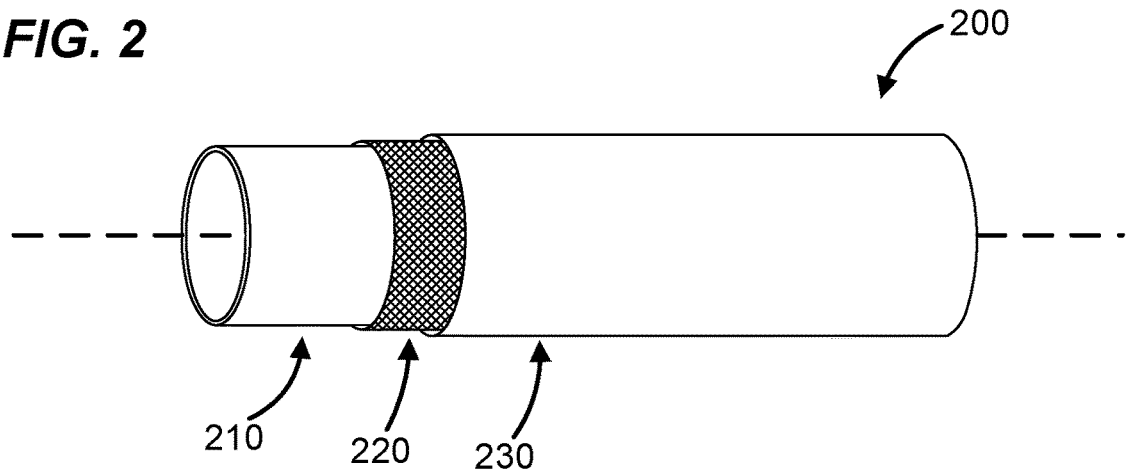
FIG. 2 shows an exemplary fireproof hose construction comprising 3-layers.

FIG. 2 shows an exemplary fireproof hose construction 200 comprising 5-layers. Hose 200 may include an inner tube 210, a first reinforcement layer 220, and an outer thermal insulation layer 230. The external thermal insulation layer 230 may be prepared from a composition that includes a silicone base rubber, an expandable graphite, and a zinc borate.

Figure 3:
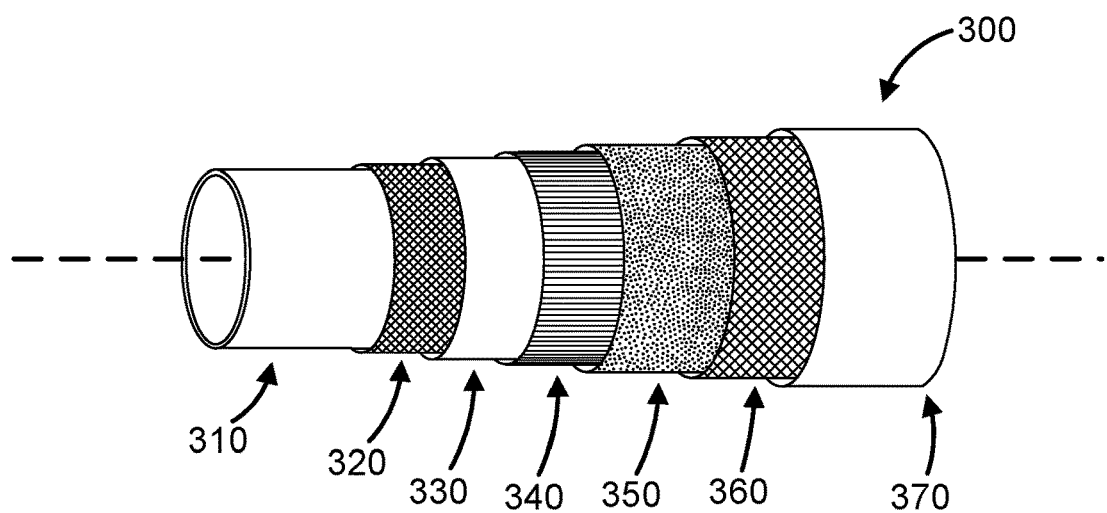
FIG. 3 shows an exemplary fireproof hose construction comprising 7-layers.

FIG. 3 shows an exemplary fireproof hose construction 300 comprising 7-layers. Hose 300 may include an inner tube 310, a first reinforcement layer 320, a first thermal insulation layer 330, a fiberglass tape layer 340, a firesleeve layer 350, a second reinforcement layer 360, and an outer thermal insulation layer 370. The first thermal insulation layer 330 and the external thermal insulation layer 370 may be prepared from a composition that includes a silicone base rubber, an expandable graphite, and a zinc borate. The intermediate firesleeve layer may include a silicone coated fiberglass sleeve such as an AE102 firesleeve.

The fireproof hose of the disclosure includes an inner tube layer that forms a flow path for conveying fluid. For example, the fireproof hose of FIG. 1 includes an inner tube layer 110 that may be prepared from any material suitable for substantially containing the fluid throughout an operating temperature range of the aircraft. For example, an operating temperature range of the aircraft can be between about −65° Fahrenheit (° F.) (about −54° Celsius (° C.)) and about +450° F. (about +232° C.). The fireproof hose may include an inner tube layer prepared from a composition comprising Polytetrafluoroethylene (PTFE). Among fluoropolymers, PTFE has the highest operating temperature, the lowest coefficient of friction, and good abrasion and chemical resistance. The ASTM Standard D4895 refers to a PTFE resin prepared from dispersion. The PTFE resins are homopolymers of tetrafluoroethylene or modified homopolymers, for example, containing not more than 1% by weight of other fluoromonomers. The PTFE may be, for example, Chemours 62X or T62X PTFE. The PTFE may exhibit a melting point of greater than 600° F. by DTA E-168, a continuous maximum use temperature of at least about 500° F. (260° C.) under D1894, and/or an intermittent maximum use temperature of at least about 550° F. The PTFE may be any suitable PTFE, for example Type 1 Grade 4 Class B under ASTM D4895.

The inner tube composition may further include a processing and/or lubricant that aids in processing, preforming, and extrusion. The processing aid may be a liquid processing aid hydrocarbon such as naphtha or other petroleum distillates. The lubricant may be, for example, a synthetic isoparaffinic fluid, for example, an Isopar™ fluid, for example, Isopar™ R, Brenntag UK Ltd. The inner PTFE tube may be formed by a process including batch sintering of PTFE tube is 740° F. and the time varies due to reduction ration and figure into line speed.

The fireproof hose can include one or more reinforcing layers. The one or more reinforcing layers can strengthen the inner tube, for example, improve kink resistance, increase the amount of pressure that can be applied to the inner tube, and/or can improve the robustness of the fireproof zone hose during exposure to fire. The one or more reinforcing layers, for example, may include a metallic braid. The metallic braid may be, for example, a stainless steel wire braid (e.g., 300 series stainless steel).

The fireproof hose may include an outer thermal insulating layer. The fireproof hose may include one or more thermal insulating layers. In some configurations, the fireproof hose may include an outer thermal insulating layer 150 and an intermediate thermal insulating layer 130.

The one or more thermal insulating layers may be prepared from a composition comprising a silicone, an expandable graphite, and a zinc borate. The silicone may be a silicone rubber. The silicone rubber may be prepared from a silicone base rubber and optionally one or more additives. The first and/or second thermal insulating layers may be prepared from a composition comprising a silicone rubber, an expandable graphite, and a zinc borate. The silicone rubber may be a solid or liquid silicone rubber. The silicone rubber may be a solid silicone rubber. Uncured silicone rubber contains polymers of different chain lengths comprising a principal silicon-oxygen chain (the siloxane backbone) and an organic moiety bound to the silicon. A silicon atom has four valence electrons which is why silicone rubber may be abbreviated with a Q for "quaternary group". Silicone rubbers, or polysiloxanes, are the only type of rubbers having an inorganic main chain, for example, (—O—$SiR_2$—O—$SiR_2$—O—$SiR_2$—O—), with organic side chains R attached to the Si atoms. For example, the silicone rubber may have general main chain chemical formula —[$R_2SiO$]n-, where R=alkyl (methyl —$CH_3$, ethyl —$CH_2CH_3$), vinyl (—CH=$CH_2$), or phenyl (—$C_6H_5$) groups. The organic groups on the polysiloxane backbone may be methyl, vinyl, and/or phenyl groups. Thus the silicone rubber may include polydiorganosiloxanes. Other rubbers have a carbon-hydrogen organic main chain, for example, (—CH—CH—CH—CH—CH—), for example, having an organic side group. The silicone rubber may include an MQ, VMQ, FVMQ, and/or PVMQ silicone rubber. MQ silicone rubbers include polydimethylsiloxanes (R=methyl). VMQ silicone rubbers are similar to polydimethylsiloxanes (MQ), but some of the methyl groups have been replaced with vinyl groups (R=methyl, vinyl). The double bond of the vinyl group is a reactive group which may be used for crosslinking. PVMQ silicone rubbers have a small portion of the methyl groups of a VMQ replaced with phenyl groups (R=methyl, vinyl, phenyl). FVMQ is a VMQ in which a small number of methyl groups have been replaced by trifluoropropyl substituents. The silicone rubbers may have predominantly methyl side groups (—$CH_3$), or optionally a few vinyl side groups to help with crosslinking. (e.g., —CH=$CH_2$). Many commercial grades are VMQ type. Phenyl groups (e.g., $C_6H_5$) may be added to improve low temperature properties. These are PVMQ types. Optional addition of fluoro groups may improve oil and fuel resistance. These are the FVMQ types. The outer thermal insulating layer may be prepared from a composition comprising a silicone base rubber selected from one or more of a VMQ, PVMQ, and/or FVMQ. The silicone rubber may include a VMQ silicone. The silicone rubber may be a non-halogen silicone rubber. Properties of VMQ silicone rubbers include soft, low viscosity, good low temperature flexibility, excellent heat resistance, good electrical properties and medium oil resistance. Curatives for silicone rubbers may include peroxides or addition (platinum) curing systems. Processing additives such as platinum based flame retardants may be employed, such as proprietary XIAMETER RBM 9001, 9004, 9003, 9010, which may be added to improve extrusion. Properties of the silicone rubber include good thermal properties and resistance to high and low temperatures, for example, a service temperature from about −110 to 250° C. The silicone rubber exhibits the widest service temperature of all the rubbers and maintains physical properties even at high temperature. Electrical properties may include very good insulation and dielectric properties, high dielectric strength, excellent arc and tracking resistance. Physical properties may include medium to low tensile strength and tear properties, very good compression set resistance. Environmental properties may include very good resistance to oxidation, ozone and weathering, high radiation resistance, medium to good resistance to chemicals and oils. Other desirable properties may include water repellency, good flame resistance with non-toxic combustion properties.

The expandable graphite may be present in the thermal insulating silicone composition between about 0.1-5 wt %, 0.5-3 wt %, 1-2 wt %, or about 1.4 wt %. The zinc borate may be present in the thermal insulating composition at between 3-20 wt %, 4-18 wt %, or 8-13 wt %. The weight ratio of the zinc borate to expandable graphite in the thermal insulating composition may be from about weight ratio of zinc borate to expandable graphite between about 30:1 to about 1:1; about 15:1 to about 2:1; about 12:1 to 2.5:1; or about 10:1 to about 5:1.

Expandable graphite is a synthesized intercalation compound of graphite that expands or exfoliates when heated. The material is manufactured by treating flake graphite with various intercalation reagents that migrate between the graphene layers in graphite crystal and remain as stable species. If exposed to a rapid increase in temperature, the intercalation reagents decompose into gaseous products, which results in high inter-graphene layer pressure. The pressure develops enough force to push apart graphite planes in the "c" axis. The result is an increase in the volume of the graphite of up to 100 times, greater than 100 times, greater than 200 times, or up to 300 times or more, a lowering of bulk density, and about a 10-fold increase in surface area. The resulting expanded flakes are referred to as "char" and provide fire retardant properties. Expandable graphite is commercially available, for example, as a non-halogenated expandable graphite, from, for example, GRAFGUARD® expandable graphite flakes (NeoGraf™ Solutions), having onset temperature of 150-250° C., having a neutral or basic surface chemistry, (pH surface of from pH 4-9), as described in, for example U.S. Pat. No. 6,669,919; as graphite intercalation compound, intumescent flake graphite, (Sigma-Aldrich), pH range 5-10, for example, $C_{24}(HSO_4)(H_2SO_4)_2$. For example, the expandable graphite may be a +50 mesh (>300µ, ≥75% min), with an expansion ratio (x:1) of 270 to 325; or as expandable graphite (Asbury Carbons) or (Graphit Kropfmuhl, Germany). The expandable graphite may be selected as having a particle size selected from 105 microns to about 350 microns. For example, the expandable graphite may have a typical average particle size of, for example, small (75%<150 microns), intermediate (150-300 microns), or large (75-80%>300 microns). The expandable graphite may have a typical average particle size selected from 105, 150, 250, 320, or 350 microns. The expandable graphite may be selected as having a typical expansion volume at 600° C. (cm3/g) of from about 80 to about 260 or greater, for example, having an expansion volume selected from about 80, 100, 175, 200, 250, 260. The carbon content of the expandable graphite may be, for example, min 90%, min. 92%, or min. 98%. Preferably, the expandable graphite is halogen free, free of heavy metals. The expandable graphite may be present in the thermal insulating silicone rubber composition at between from about 0.1-15 wt %, 0.3-10 wt %, 0.5-5 wt %, 1-3 wt %, or about 1.4 wt %.

The thermal insulating composition may include a silicone base rubber with an expandable graphite and added zinc borate. The zinc borate may be a zinc borate hydrate. The zinc borate may be a dodecaboron tetrazinc docosaoxide heptahydrate. Zinc borate may release its water of hydration at temperatures exceeding about 290° C. (554° F.). The zinc borate may have a chemical formula 2 $ZnO_3B_2O_3.3.5 H_2O$. The zinc borate may have a median particle size by laser diffraction of 9 microns (e.g., FIREBRAKE® ZB, US Borax, Inc.), 2.1 microns (e.g., FIREBRAKE® ZB-Fine), or 1.8 microns (e.g., FIREBRAKE® ZB-XF). The zinc borate may be present at between 3-20 wt %, 4-18 wt %, 5-15 wt %, or 8-13 wt % in the thermal insulating layer composition.

The thermal insulating composition may include a silicone base rubber with expandable graphite and added zinc borate. The silicone may be any silicone base rubber suitable for molded articles and extrusions. For example the silicone base rubber may include ELASTOSIL® R 401/60 silicone rubber (Wacker Chemie AG, Munich, Germany). The thermal insulating composition may include from about 40-80 wt %, or about 50-70 wt % of a silicone base rubber.

The silicone rubber base composition may also include one or more additives. Suitable additives may include, but are not limited to, curing agents, process aids, adhesion promoters, antioxidants, ultraviolet light stabilizers, fillers, thixotropic agents, additional silicones, dyes/colorants, and combinations thereof.

The silicone rubber base composition may also include various curing agents, including but not limited to, for example, a peroxide. For example, the peroxide cure agent may be a 50% paste of bis-(2,4-dichlorobenzoyl)-peroxide in silicone fluid, dicumyl peroxide, or a 45% paste of 2,5-bis-(t-butylperoxy)-2,5-dimethyl-hexane in silicone rubber. The curing agent may be present at from about 0.1-3 wt %, 0.3-1 wt % of the thermal insulating composition. A further organic peroxide may be employed in the composition. The further organic peroxide may be, for example, a monofunctional organic peroxide. The organic peroxide may be, for example, di(2,4-dichlorobenzoyl) peroxide. The organic peroxide may be present at, for example, 0-5 wt %, 0.1-3 wt %, or 0.5-2 wt % of the thermal insulating composition.

The silicone rubber base composition may also include various fillers, such as a ground silica $SiO_2$ filler. The fillers may be employed at from about 0-30 wt %, 1-20 wt %, 5-15 wt %, or about 10-12 wt % of the thermal insulating composition.

The silicone rubber base composition may also include various pigments or colorants for example at 0.1 to 5 wt %, 0.2-3 wt % of the composition.

Various additional additives such as antioxidants, process aids, or additional fire retardants may be employed in the thermal insulation composition, for example at about 0-3 wt %, or 0.1-2 wt %.

Any suitable mixer may be employed for preparing the silicone rubber compositions, which may be prepared by mixing two parts A and B. For example, a roll mill or a Banbury™ mixer (Farrel Corporation) may be used to mix the different formulations according to the disclosure, for example, under ASTM D 3182-07. For example, a silicone rubber base composition may be prepared and mixed with expandable graphite, then zinc borate may be added to the silicone mix. The composition may be extruded or molded and cured. The cured composition may be tested for physical properties, flame resistance and char formation.

The silicone thermal insulating composition may be extruded over the inner tube or the reinforcing layers and may be cured at a temperature between 340° F. to 375° F. in a molten salt bath. The composition may include a dual catalyst compound and the hi-temp catalyst doesn't cure in an oxygen environment. Silicone times are 9-15 fpm across 55 ht of salt tank.

Figure 4:
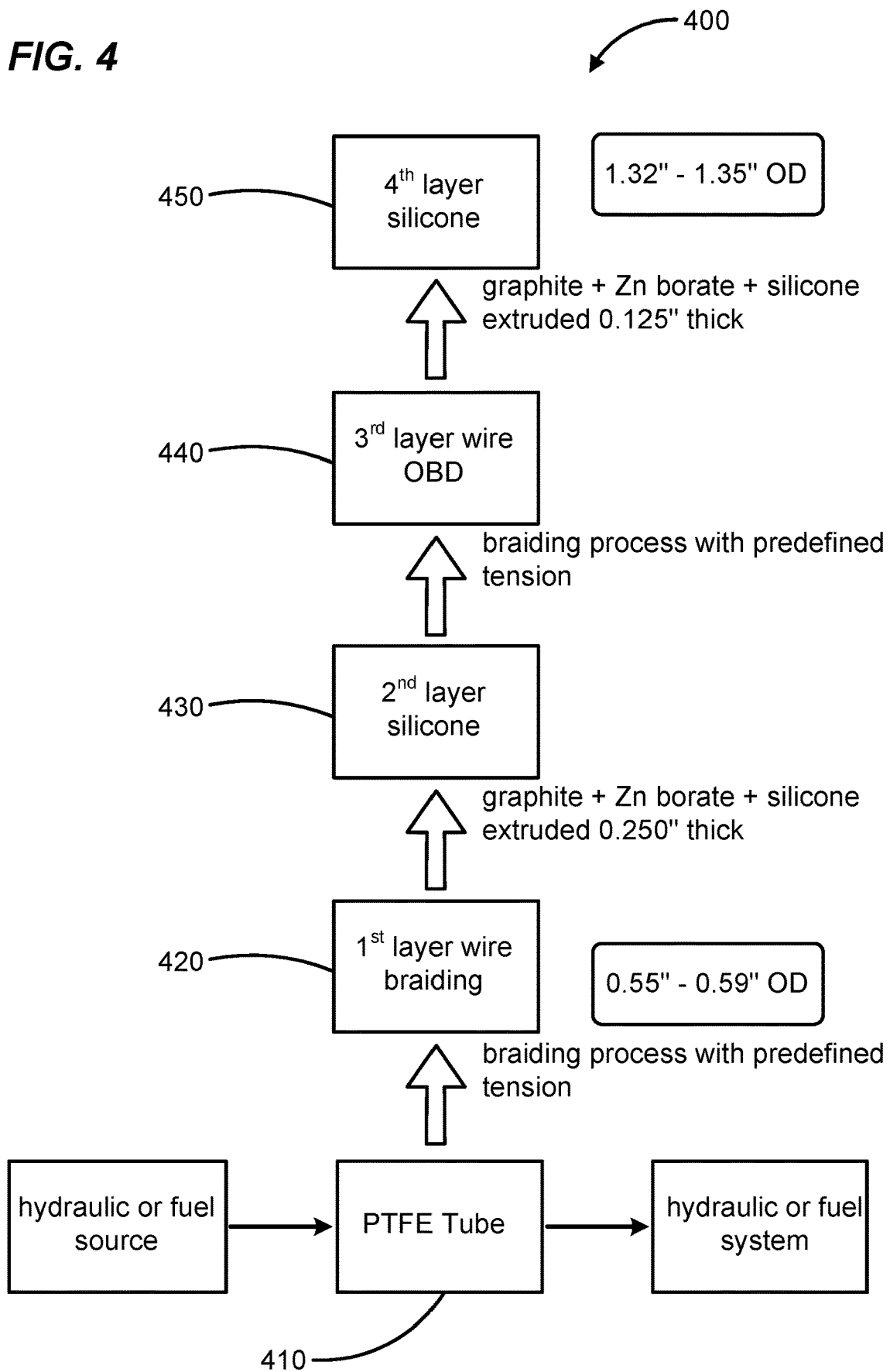
FIG. 4 shows an exemplary process for a hose construction comprising 5-layers.

FIG. 4 shows an exemplary 5-layer fireproof hose construction process 400 for preparing a fireproof hose. An inner PTFE tube 410 is formed from a composition comprising PTFE. A first reinforcement layer 420 is formed over the PTFE tube 410 using a wire braiding process with a predefined tension, for example, having an OD of 0.55"-0.59"(inches). A first thermal insulating silicone layer 430 is formed over the first reinforcement layer 420, for example, by extrusion from a silicone composition comprising a silicone base rubber, an expandable graphite, and a zinc borate. The first thermal insulating layer may be, for example, 0.25" inches thick. A second reinforcement layer 440 is formed over the silicone thermal insulating layer using a wire braiding process OBD with predefined tension. A second thermal insulating silicone layer 450 is formed over the first reinforcement layer 440, for example, by extrusion from a silicone composition comprising a silicone base rubber, an expandable graphite, and a zinc borate to form an outer layer. The second thermal insulating layer may be, for example, 0.125" thick. The fireproof hose 400 may have an OD of 1.32"-1.35". Higher ODs are contemplated.

Figure 5:
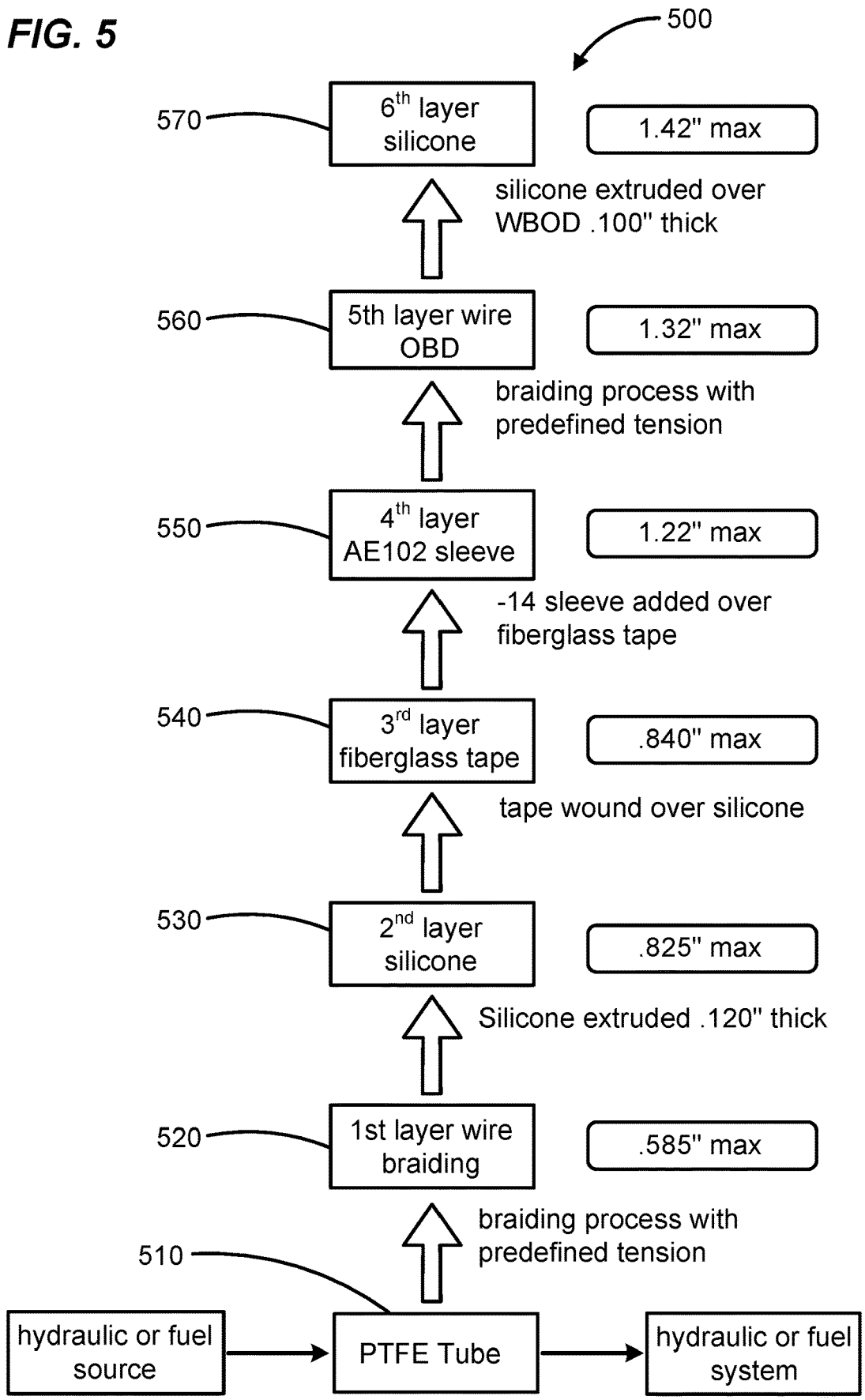
FIG. 5 shows an exemplary process for a hose construction comprising 7-layers.

FIG. 5 shows another exemplary 7-layer fireproof hose construction process 500. A PTFE tube 510 is prepared and subjected to a wire braiding process with a predefined tension to form a first reinforcement layer 520. The layer 520 may have an OD of 0.585 inches. A first thermal insulating silicone layer 530 comprising a silicone base composition, expandable graphite and zinc borate is extruded over the first layer wire braiding, having a thickness of 0.120 inches. A fiberglass tape layer 540 is wound over the silicone layer 530 such that the hose layer has a 0.840 inch OD. A firesleeve layer 550 is added over the fiberglass tape layer 540 and subjected to a wire braiding process with a predefined tension to form a second reinforcement layer 560. A second thermal insulating silicone layer 570 comprising a silicone base composition, expandable graphite and zinc borate is extruded over the second reinforcement layer wire braiding, having a thickness of 0.100 inches to form an outer layer having a 1.42 inch max OD. Higher ODs are contemplated.

To manufacture the fireproof hose 100, the inner tube 110 is initially extruded over a mandrel. If the inner tube 110 includes two or more layers, they can be co-extruded. Next, the hose reinforcing layer 120 is braided over the inner tube 110 on the mandrel. Subsequently, the thermal insulating silicone rubber layer 130 is extruded over the hose reinforcing layer 120 and the inner tube 110 on the mandrel. Next, the hose reinforcing layer 140 is overbraided over the thermal insulating silicone rubber layer 130. Subsequently, the thermal insulating silicone rubber layer 150 is extruded over the hose reinforcing layer 140 on the mandrel. The assembly can be passed through a water cooling tank to help it set cool slightly. If a flexible mandrel is being used, the hose can then be coiled. The hose is then put into an autoclave for curing. Thereafter, the mandrel is ejected from the hose using pressure. It will be appreciated that the fireproof hose of FIG. 2 or 3 can be manufactured in a similar manner.

EXAMPLES

Example 1. Thermal Insulating Silicone Compositions

A silicone base composition was selected for development with a goal of improving flame resistance and achieving good char formation. Expandable graphite was added to the silicone base composition at various amounts between 0.5% up to 15%. However, higher concentrations of expandable graphite resulted in loss of green strength. The range of expandable graphite of 0.5% to 5% was further explored. Three particle sizes of expandable graphite (each having typical average particle size 150, 250, or 350 microns) exhibited good flame retardant characteristics. However, the cured silicone composition exhibited some crumbling when heated, and char formation was inconsistent. A silicone base composition having 1.4% expandable graphite (GRAFGUARD® GG220-80N, 250 microns) was selected for optimization using various concentrations of zinc borate to maintain good flame resistance, but reduce crumbling and enhance char formation.

Thermal insulating silicone compositions were prepared with expandable graphite and zinc borate at various concentrations. A representative silicone rubber composition having 1.4 wt % expandable graphite and 13 wt % zinc borate is shown in Table 2.

TABLE 2

Thermal Insulating Silicone Compositions

| Description | Quantity (lbs.) | Wt % |
|---|---|---|
| ELR401/60 Silicone Base rubber | 109.0 | 60.6 |
| FR3 Fire Retardant (RBM-9) -process aid | 20.7 | 11.5 |

TABLE 2-continued

Thermal Insulating Silicone Compositions

| Description | Quantity (lbs.) | Wt % |
|---|---|---|
| Minusil 5 Micron Rubber -ground silica SiO2 | 18.5 | 10.3 |
| Di-Cup 40KE Rubber Addition-dicumyl peroxide catalyst | 0.8 | 0.5 |
| Soligum Red 058 Rubber | 1.2 | 0.7 |
| CM126 Black Silicone | 0.4 | 0.2 |
| Silogum Blue 211 | 2.2 | 1.2 |
| Perkadox PD-50S-PS-A-organic peroxide | 1.7 | 0.9 |
| GG220-80N- expandable graphite | 2.4 | 1.4 |
| Firebrake ZB-zinc borate | 23.5 | 13.0 |
| Totals | 180.4 | 100 |

Specifically, a silicone composition of Table 2 was prepared by mixing on mill with a silicone base composition 1.4% expandable graphite. The zinc borate was added as needed to the silicone mix to obtain silicone rubber compositions having 3 wt %, 4 wt %, 5 wt %, 8 wt %, 13 wt % and 18 wt % zinc borate. Mixing the zinc borate samples was easier on mill compared to mixing graphite (1.4 wt %). A dispersion test was performed to validate uniformity of distribution of zinc borate and expandable graphite in silicone. The samples were cured at a temperature between 340° F. and 375° F. in a molten salt bath.

Physical properties were measured for all combinations. The properties of the materials were tested in accordance with ASTM D412 (Tensile, elongation & modulus); ASTM D2240 (hardness); Flame resistance was performed according to MSHA ASTP5007 under 30 CFR § 18.65; and Char formation is a visible test after MSHA ASTP5007; Shore A Hardness test was performed in accordance with ASTM D 2240-95, for example, using a calibrated Instron automatic Durometer tester. Results are shown in Table 3.

TABLE 3

Thermal Insulating Silicone Rubber Composition Physical Properties

| Zinc Borate wt % | 3% | 4% | 5% | 8% | 13% | 18% |
|---|---|---|---|---|---|---|
| Wt ratio ZB/EG | 2.1:1 | 2.9:1 | 3.6:1 | 5.7:1 | 9.3:1 | 12.9:1 |
| Hardness (Duro A) | 76 | 74 | 76 | 76 | 77 | 81 |
| Tensile Strength (psi) | 503 | 525 | 540 | 580 | 699 | 491 |
| Elongation (%) | 137 | 142 | 142 | 159 | 171 | 87 |
| 50% Modulus (psi) | 321 | 302 | 316 | 323 | 288 | 414 |
| 100% Modulus (psi) | 412 | 413 | 424 | 421 | 428 | 25 |
| Flame Resistance | High | High | High | High | High | High |
| Char formation* | Low | High | High | High | High | High |

*After heating 5 minutes at 1500° F.; ZB is zinc borate; EG is expandable graphite Samples with 1.4 wt % expandable graphite and 4 to 13 wt % zinc borate percentage exhibited better tensile strength. The silicone composition having 18% zinc borate exhibited an undesirable reduction in physical properties including tensile strength, percent elongation and 100% Modulus.

Example 2. Flame Resistance Test

A flame test was performed according to MSHA's standard flame test procedure under 30 CFR 18.65. Samples were prepared of a silicone composition similar to Table 2 including 1.4% expandable graphite and having 3 wt %, 4 wt %, 5 wt %, 8 wt %, 13 wt %, 15.5%, and 18 wt % zinc borate and cured. The test samples included weight ratios of zinc borate (ZB) to expandable graphite (EG) of from 2 to 1 to 12.9 to 1. Four specimens each 6 inches long by ½ inch wide by thickness of the cured silicone rubber test samples were subjected to the flame resistance test. Specimens are mounted to support stand with ring clamp and wire gauze inside test cabinet. A variable speed electric fan and ASME flow nozzle to attain constant air velocities between 50-500 feet a minute. A Pittsburgh-Universal Bunsen-type burner is mounted in test cabinet and is adjusted to give a blue flame 3 inches in height with natural gas. The burner flame is applied to the free end of the specimen for 1 minute in still air. At the end of 1 minute the burner flame is removed, the ventilating fan turned on the give an air current of 300 feet per minute and the duration of flame is measured using a stop watch. After the test specimen ceases to flame, it shall remain in air current for at least 3 minutes to determine presence and duration of afterglow.

Test Requirements. The test of four specimens cut from any sample shall not result in either duration of flame exceeding an average of 1 minute after removal of the applied flame, or afterglow exceeding an average of 3 minutes duration.

Figure 6:
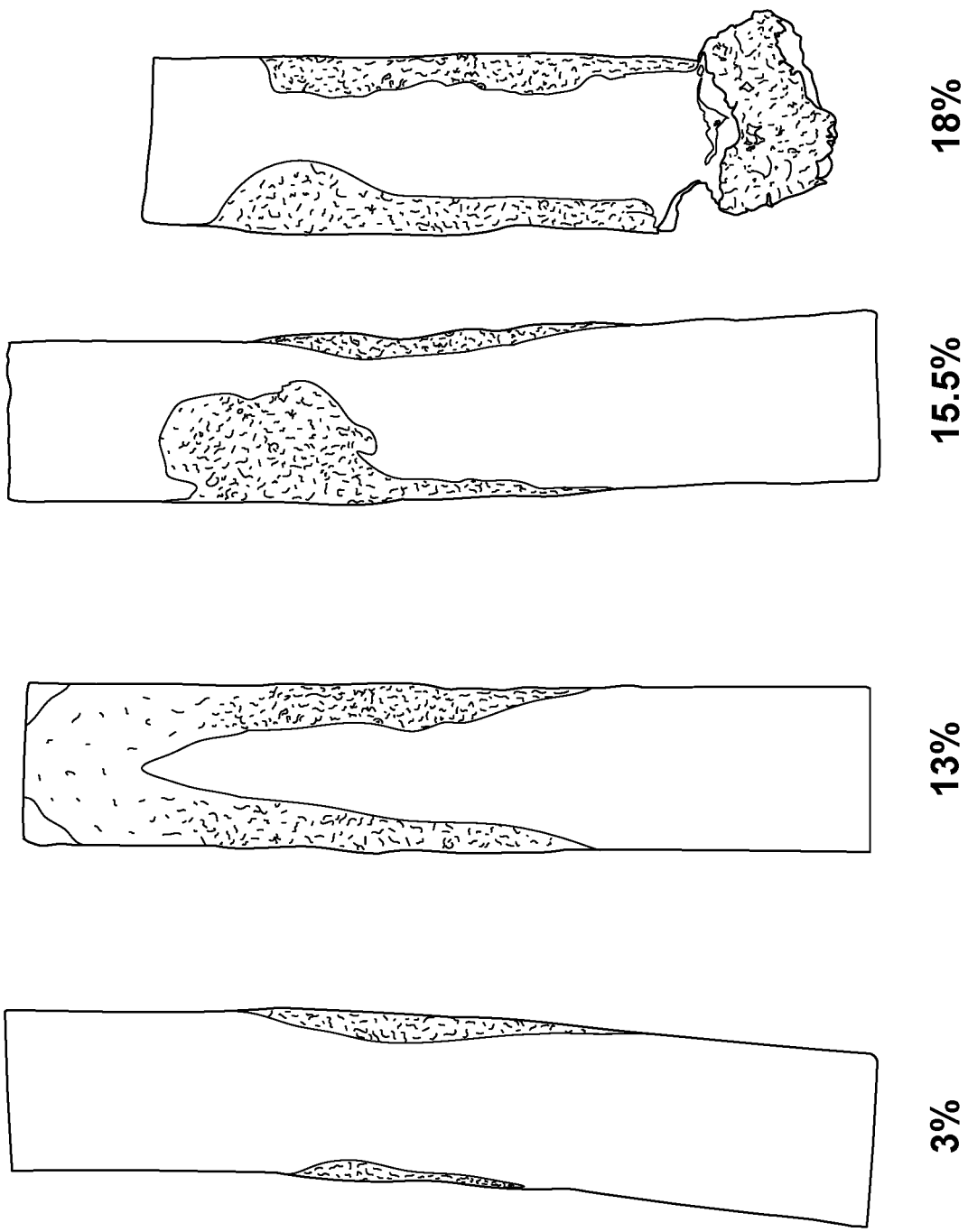
FIG. 6 shows line drawings of coupons of cured silicone compositions according to the disclosure with char formation after heating in excess of three minutes at 1500° F.

Results for the Flame Resistance Test are shown in Table 3. All samples passed the flame resistance test, as shown in Table 3. The samples were each weighed before and after the flame resistance test and did not exhibit a significant reduction in weight. Sufficient char was formed on the samples containing zinc borate 4 wt % or greater. FIG. 6 shows coupons of cured silicone compositions with char formation (white areas) after heating for five minutes at 1500° F. Surprisingly, samples with lowest amount of zinc borate (3 wt %) had very little to no visual char formation as shown in FIG. 6. Samples of the cured silicone rubber composition having 1.4 wt % expandable graphite and 4-15 wt % zinc borate each exhibited high flame resistance and high char formation. Based on physical properties and flame resistance test results silicone mix compositions including 1.4 wt % expandable graphite and 8-13 wt % zinc borate were selected for fireproof hose construction.

Example 3. Fireproof Hose Comprising PTFE Inner Core Tube and Outer Thermal Insulating Silicone Rubber Layer A prototype hose was prepared according to the invention, comprising a PTFE inner tube 110 (Chemours 62X PTFE), a 304 stainless steel braid reinforcing layer 120 was applied using a braiding process with predefined tension, a silicone rubber thermal insulating layer 130 according to Table 2 having 1.4 wt % expandable graphite and 13 wt % zinc borate was extruded over the reinforcing layer to a thickness of 0.25", a 304 stainless steel overbraid reinforcing layer 140 was applied to the thermal insulating layer 130, and a silicone rubber thermal insulating outer layer 150 according to Table 2 was extruded over the second reinforcing layer 140 to a thickness of 0.125". The cured hose had a 1.32" to 1.35" OD. Following cure, the hose will meet AS1055 and TSO fire performance requirements under zero flow conditions, pass the flame resistance test under MSHA ASTP5007, and exhibit high char formation.

What is claimed is:

1. A fireproof hose having a multiplicity of layers comprising
   an outer thermal insulating layer prepared from a thermal insulating composition comprising a silicone, an expandable graphite, and a zinc borate, comprising a weight ratio of zinc borate to expandable graphite between from about 12:1 to about 2.5:1.
2. The fireproof hose of claim 1, further comprising
   an inner tube layer prepared from a composition comprising PTFE; and
   a reinforcing layer.
3. The fireproof hose of claim 2, wherein the reinforcing layer is disposed between the inner tube layer and the outer thermal insulating layer.
4. The fireproof hose of claim 1, further comprising a fiberglass tape or sleeve layer.
5. The fireproof hose of any one of claim 1, wherein the thermal insulating composition comprises from about 40-80 wt %, or about 50-70 wt % of a silicone base rubber.
6. The fireproof hose of claim 1, wherein the thermal insulating composition comprises between about 3-20 wt %, 4-18 wt %, 5-15 wt %, or 8-13 wt % of the zinc borate.
7. The fireproof hose of claim 1, wherein the thermal insulating composition comprises between about 0.1-15 wt %, 0.3-10 wt %, 0.5-5 wt %, 1-3 wt %, or about 1.4 wt % of the expandable graphite.
8. The fireproof hose of claim 1, wherein the thermal insulating composition comprises a silicone rubber composition comprising a weight ratio of zinc borate to expandable graphite between from about 10:1 to about 5:1.
9. The fireproof hose of claim 1, wherein the thermal insulating composition further comprises additives selected from the group consisting of curing agents, process aids, additional fire retardants, adhesion promoters, antioxidants, ultraviolet light stabilizers, fillers, thixotropic agents, additional silicones, dyes, and colorants.
10. The fireproof hose of claim 9, wherein the thermal insulating composition comprises about 0-30 wt %, 1-20 wt %, 5-15 wt %, or about 10-12 wt % of a ground silica filler.
11. The fireproof hose of claim 2, wherein the reinforcing layer comprises a metallic braid, optionally a stainless steel metallic braid.
12. A fireproof hose comprising a multiplicity of layers from an inner to an outer radial direction comprising:
    i) an inner tube layer prepared from a composition comprising a PTFE;
    ii) a first reinforcing layer comprising a metallic braid;
    iii) a first thermal insulating layer;
    iv) a second reinforcing layer comprising a metallic braid; and
    v) a second thermal insulating layer prepared from a composition comprising a silicone base rubber, an expandable graphite, and a zinc borate, comprising a weight ratio of zinc borate to expandable graphite between from about 12:1 to about 2.5:1.
13. The fireproof hose of claim 1, wherein the thermal insulating layer exhibits
    i) hardness of 70 to 85 Shore A under ASTM 2240;
    ii) tensile strength between 500 to 750 psi under ASTM D412;
    iii) percent elongation of from 100 to 200% under ASTM D412;
    iv) 50% Modulus of from 250 to 350 psi under ASTM D412; and
    v) 100% Modulus of from 300 to 450 psi under ASTM D412.
14. The fireproof hose of claim 1, wherein the thermal insulating layer cured silicone rubber composition passes flame resistance test when tested under MSHA ASTP5007; and exhibits high visual char formation when tested under MSHA ASTP5007.

15. The fireproof hose of claim 1, wherein the hose meets or exceeds 15 minute AS1055 and TSO performance requirements under no flow conditions.

16. The hose of claim 1, wherein the hose is rated for a continuous operating temperature range of −65° F. to +450° F. (−54° C. to +232° C.).

17. A method of making a fireproof hose comprising forming an inner tube layer prepared from a composition comprising a PTFE;

braiding a first reinforcing layer comprising a metallic braid over the inner tube layer;

extruding a silicone rubber composition over the reinforcing layer to form a thermal insulating layer to form a green hose, wherein the silicone rubber composition comprises a silicone base rubber, an expandable graphite, and a zinc borate, comprising a weight ratio of zinc borate to expandable graphite between from about 12:1 to about 2.5:1; and curing the green hose to form the fireproof hose.

18. The method of claim 17, wherein the silicone rubber composition comprises from about 40-80 wt %, or about 50-70 wt % of the silicone base rubber.

19. The method of claim 17, wherein the silicone rubber composition comprises between about 3-20 wt %, 4-18 wt %, 5-15 wt %, or 8-13 wt % of the zinc borate.

20. The method of claim 17, wherein the silicone rubber composition comprises between about 0.1-15 wt %, 0.3-10 wt %, 0.5-5 wt %, 1-3 wt %, or about 1.4 wt % of the expandable graphite.

21. The method of claim 17, wherein the silicone rubber composition comprises a weight ratio of the zinc borate to the expandable graphite between from about 10:1 to about 5:1.

* * * * *